United States Patent

[11] 3,570,620

| [72] | Inventors | Gene L. Fisher<br>Freeland;<br>Allan R. Thieme, Bridgeport, Mich. |
|---|---|---|
| [21] | Appl. No. | 791,462 |
| [22] | Filed | Jan. 15, 1969 |
| [45] | Patented | Mar. 16, 1971 |
| [73] | Assignee | said Fisher assignor to said Thiene |

[54] ELECTRICALLY POWERED VEHICLE
26 Claims, 6 Drawing Figs.

[52] U.S. Cl. ................................................ 180/26, 180/65, 180/34
[51] Int. Cl. ........................................ B60l 11/18
[50] Field of Search ........................................ 180/31, 26, 65, 13, 34; 200/153 (.19); 318/137; 180/34

[56] References Cited
UNITED STATES PATENTS

| 2,892,506 | 6/1959 | Slater | 180/26 |
| 1,037,435 | 9/1912 | Case | 318/139X |
| 2,379,305 | 6/1945 | Kaminky | 200/153X |
| 2,391,881 | 1/1946 | Clay | (200/153UX) |
| 2,513,718 | 7/1950 | Gfrorer | 180/13X |
| 3,188,978 | 6/1965 | Dolphin et al. | 180/13X |
| 3,190,387 | 6/1965 | Dow | 180/65 |
| 3,289,780 | 12/1966 | Ferris | 180/65X |
| 3,356,173 | 12/1967 | Holcombe | 180/65 |

FOREIGN PATENTS

| 858,021 | 5/1940 | France | 180/65 |

Primary Examiner—Kenneth H. Betts
Attorney—Learman, Learman & Mc Culloch

ABSTRACT: An electrically powered land vehicle and method of controlling same through the use of two electric motors which may be operated in series or parallel with provisions for one motor to be operated independently through a new and improved switch means.

PATENTED MAR 16 1971

INVENTORS
ALLAN R. THIEME
GENE L. FISHER

BY *Learman, Learman & McCulloch*

*Attorneys*

INVENTORS
ALLAN R. THIEME
GENE L. FISHER

ELECTRICALLY POWERED VEHICLE

This invention relates to electrically powered land vehicles and methods of controlling same. More particularly, this invention relates to control apparatus for controlling the speed and operation of electrically powered vehicles.

In the vehicle field, there exists a need for a vehicle which can easily and simply be controlled by the handicapped. Such vehicles require proper amounts of power at proper intervals. If the response of the power train is either too rapid or too slow, a safety hazard exists to the operator.

Such vehicles have been designed in the past but have had disadvantages. For example, the control mechanism has been inaccessible to the operator. In a device of this kind the control mechanism must be accessible to the operator without requiring that the operator remove his hands from the handlebars. When the operator must remove his hands from the handlebars a safety hazard is created, particularly if the vehicle is negotiating a turn or transversing rough terrain. More importantly, however, it may be impossible for some handicapped operators to respond if the entire hand must be removed from the handlebars in order to control the vehicle. The prior art devices are also difficult to repair and maintain and have used various systems of control which have not provided adequate flexibility in regard to power, response, or control therefor.

Briefly, in accordance with the present invention, there is provided a new and improved electrically powered vehicle having at least a pair of spaced-apart road wheels, at least one of which is drivingly connected with a pair of electric motors mounted on the vehicle. The motors are energized by an electrical power source which may be suitably mounted on the vehicle. A switch means is mounted on the handlebars of the vehicle and controls the flow of current from the source to the motors such that the two motors may be connected in series circuit relation or in parallel circuit relation or, if desired, one of the motors may be operated independently. The switch means is mounted in a housing and includes a pivotably mounted actuator in the housing for engaging a plurality of switch devices which are also mounted in the housing. The actuator has a portion thereof which extends through the housing and which can be controlled by the operator without removing his hands from the handlebars. Means for reversing at least one of the motors is provided as well as a connector mounted on the housing through which all electrical connections between the switch and the power source and motor must pass. This enables the switch means to be quickly disconnected from the vehicle.

Other objects and advantages of the present invention will become apparent to one of ordinary skill in the art upon review of the following description in conjunction with the accompanying drawings in which.

Figure 1:
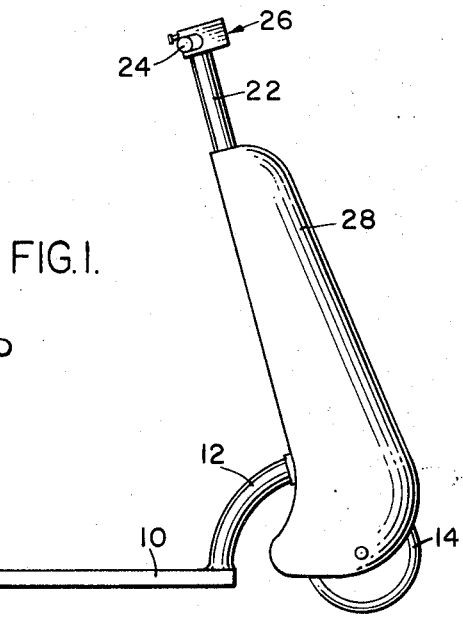
FIG. 1 is a side elevational view of the vehicle as a whole.

Referring now to the drawings wherein similar numerals will refer to similar parts in the various FIGS., the vehicle shown in FIG. 1 is a scooter having a platform frame 10 upon which the feet of the vehicle operator rest while the vehicle is in motion. A curved portion 12 is attached to the forward portion of frame 10 in any suitable manner such as by welding and provides the support for the front of the vehicle. Mounted on opposite ends of the frame are spaced-apart front and rear wheels 14 and 16, respectively. If desired, the rear wheel 16 may be a single wheel, but preferably includes a pair of axially spaced-apart wheels to increase the stability of the vehicle. As noted in the drawing, the vehicle wheels are relatively small and the platform 10 is relatively close to the ground so as to have a low center of gravity for increased stabilization. Mounted on the rearward portion of platform 10 is a seat 18 of any suitable design supported by a column 20. At the front of the vehicle, steering column 22 has a demountable kingpin connection 22a to the curved portion 12 of the vehicle. One end of the steering column may be bifurcated so as to receive front wheel 14, and the other end of steering column 22 supports handlebars 24 which in turn support switch means 26 for controlling the vehicle. A skirt 26 may be placed on the vehicle for protecting the operable elements.

Figure 2:
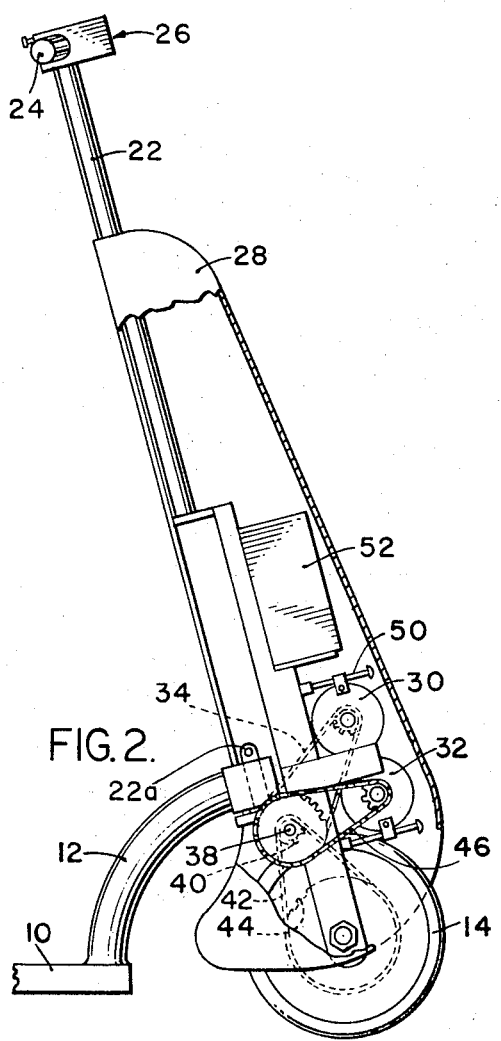
FIG. 2 is a partly sectional side elevational view of the front portion of the vehicle only.
Figure 3:
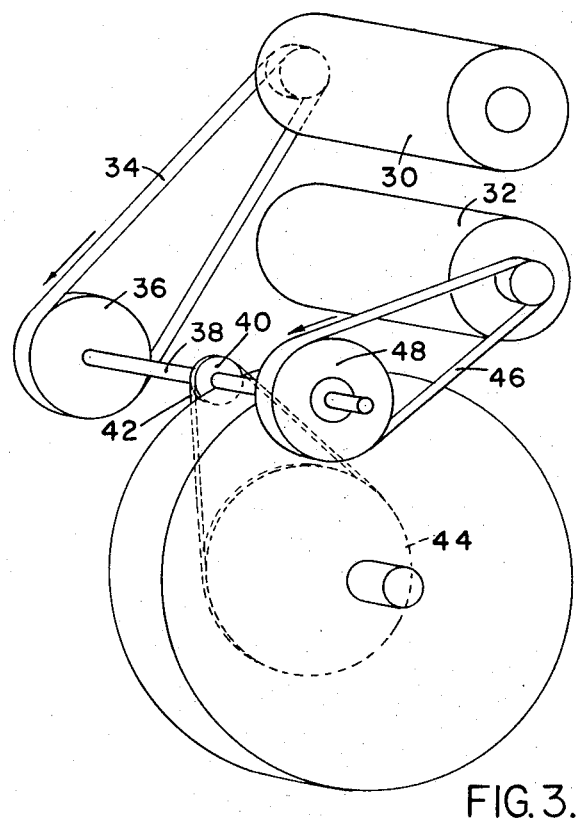
FIG. 3 is a schematic perspective view illustrating the manner in which the motors are drivingly connected to the road wheel.

Referring now to FIGS. 2 and 3, first and second motors 30 and 32 are provided, preferably direct current reversible motors. Motor 30 is drivingly connected with front wheel 14 by means of drive chain 34 and sprocket 36 which is mounted on the shaft 38. By means of gear 40 and chain 42, power is transmitted from shaft 38 through gear 44 to wheel 14. Power is transmitted from motor 32 to wheel 14 by means of an overrunning clutch 48. This clutch permits motor 30 to drive wheel 14 without turning the armature of motor 32, and yet permits motor 32 to assist motor 18 in driving wheel 14 when both motors are energized. A chain 46 suitably connects the motor 32 and clutch 48. Tension adjusting devices 50 may be conveniently mounted between each motor in the frame to provide adequate tension for chains 34 and 46. It should be understood, of course, that the above referenced chains and gears could be replaced by drive belts and pulleys if desired.

The power source may consist of a battery such as that shown at 52 suitably mounted on the front of the vehicle. The connection between the source of potential 52 and motors 30 and 32 will be described more fully hereinafter, however, it may generally be stated at this time that the connection therebetween passes through switch means 26 mounted on handlebars 24.

Figure 4:
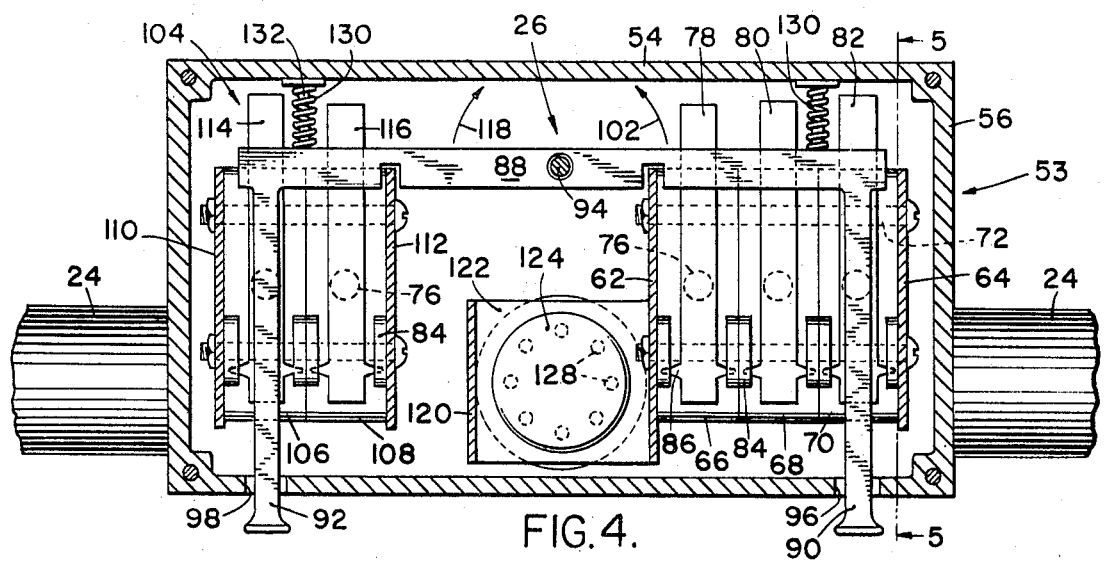
FIG. 4 is a plan view of the switch means according to the invention, taken along the line 4—4 of FIG. 5.
Figure 5:
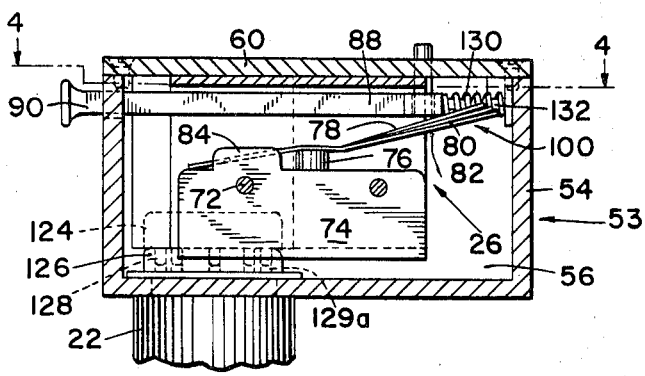
FIG. 5 is a cross-sectional view of the switch means taken along lines 4—4 of FIG. 4.

Referring now to FIGS. 4 and 5, the switch means shown generally at 26 is mounted in a housing generally designated 53, which is secured to handlebars 24. The housing 53 has pairs of sidewalls 54 and 56 which are formed integrally with a bottom wall 58, which is rigidly secured to steering column 22 in any suitable manner such as by welding. A cover for the housing is shown at 60 and is removably secured to the sides 54 and 56 by screws. Integrally formed with cover 60 are vertically depending walls 62 and 64 having first, second and third switch devices 66, 68 and 70 mounted therebetween by means of bolts 72. Each of the first, second and third switching devices includes a modular housing 74 in which the contacts and wiring for each switch are maintained. An actuator button 76 is reciprocably mounted in the top of each modular housing 74 and extends into the housing of each switch device. Mounted to engage each button 76 are reedlike members 78, 80 and 82 for each of the first, second and third switch devices 66, 68 and 70, respectively. As will be described hereinafter, each reedlike member and its associated actuator button comprises a vertically movable force responsive portion of the switch means for actuating each of the respective switch devices to open and close the electrical circuit between the source 52 and motors 30 and 32. Reeds 78, 80 and 82 are pivotally secured to switching devices 66, 68 and 70 by means of extensions 86 which are secured in upper portions 84 of housings 74.

Mounted in the upper portion of the housing 53 for the switch mechanism is an actuator means including a laterally extending bar 88 and right- and left-hand energizing pushbutton plungers 90 and 92 extending through the housing 53. Actuator bar 88 is pivotally mounted about pivot pin 94 which is fixed to and depends from the top 60 of the housing. Openings 96 and 98 are formed in the rear side of the housing 53 to permit free movement of the plungers 90 and 92 in a manner which will be described more fully hereinafter. Each of the openings 96 and 98 are cut to a depth sufficient to permit the right- and left-hand plungers 90 and 92, respectively, to rest thereon when the switch means is positioned as shown in the drawings.

As can best be seen in FIG. 5, each of the reedlike members 78 through 82 extends under the actuator bar 88, and each reed extends angularly upwardly as shown at 100. When plunger 90 is moved inwardly in a first direction, as indicated by an arrow 102, actuator bar 88 sequentially engages reeds 78, 80 and 82, thereby causing each spring returned respective plunger 76 to move downwardly and actuate each of the respective switches 66, 68 and 70.

Mounted on the opposite side of pivot pin 94 is a reversing switch indicated generally at 104 and including first and second switch devices 106 and 108 which are for all practical purposes identical to the previously described switch devices 66, 68 and 70. These switch devices are similarly mounted between a pair of vertically disposed plates 110 and 112 which also depend from the cover 60 of the housing. The reeds 114 and 116 of switch devices 106 and 108 are formed to extend angularly upwardly in a manner similar to that previously described. However, as can be seen in FIG. 5, each of the reeds 78, 80 and 82 extend angularly upwardly at different angles so that when actuator bar 88 is rotated about pivot pin 94, reed 78 will be depressed prior to the depression of reed 80 which must be depressed prior to the depression of reed 82 and its associated button 76. In opposition thereto, reeds 114 and 116 of the reversing switches preferably extend at the same angle to the horizontal so as to be simultaneously engaged and depressed downwardly when actuator bar 88 is rotated in the direction indicated by arrow 118.

The switch mechanism is so constructed that the actuator 88 must contact reed 78 of the first switch device prior to contacting reed 80 of the second switch device 68 so that the first switch device 66 will be actuated prior to the second switch 68 being actuated. As a consequence, the vertically movable force responsive portion of switch 78 cannot be released upwardly to deactivate the front switch until the second switch 68 is deactivated. Similarly, rotation of actuator bar in the direction indicated by arrow 102 causes actuator bar 88 to contact reed 80 prior to contacting reed 82 so that the second switching device 68 must be actuated prior to actuation of the third switch device 70. As a consequence thereof, the vertically movable force responsive portions 80 and 76 of the second switching device 68 cannot be raised upwardly to deactivate switching device 68 until after the third switch device 70 has been deactivated. On the other hand, when actuator bar 88 is moved in the direction indicated by arrow 118, the vertically movable force responsive portions 114, 116 and the respective actuator button 76 for each switching device 106 and 108 are moved simultaneously downward so that both switching devices 106 and 108 actuate and deactivate at substantially the same time.

A connector plate structure also depends from cover 60 and comprises a vertically extending portion 120 and a laterally extending portion 122. Portion 122 is rigidly secured at its other side to vertically depending wall 62. The electrical connections between the switch means 26 and the source 52 and motor 30 and 32 all pass through a single connector comprising male connector 124 which is mounted by plate 122 and a female connector socket 126 which is mounted in the bottom 58 of the housing. The electrical wires for each of the switches 66, 68, 70, 106 and 108 are not shown for purposes of clarity, however, they are appropriately connected to the prongs 128 of the male connector which are received in the sockets 129a of the female connector plate.

Mounted on opposite sides of pivot pin 94 are a pair of biasing springs 130 mounted between the front wall 54 of the housing 53 and opposite sides of the actuator bar. Pins 132 and 134 extend from the housing and actuator bar, respectively, to support the biasing springs.

The switch means 26 may be readily disassembled by merely lifting cover 60 off the housing whereby male and female connector plates 124 and 126 are disconnected, plungers 90 and 92 move upwardly through slots 96 and 98, and all elements within the housing can be removed leaving only the sidewalls of the housing 54 attached to the handlebars 24. This facilitates maintenance and permits rapid replacement of a switch mechanism on the vehicle, while the switch mechanism removed is undergoing repair so that machine downtime is held to a minimum.

Figure 6:
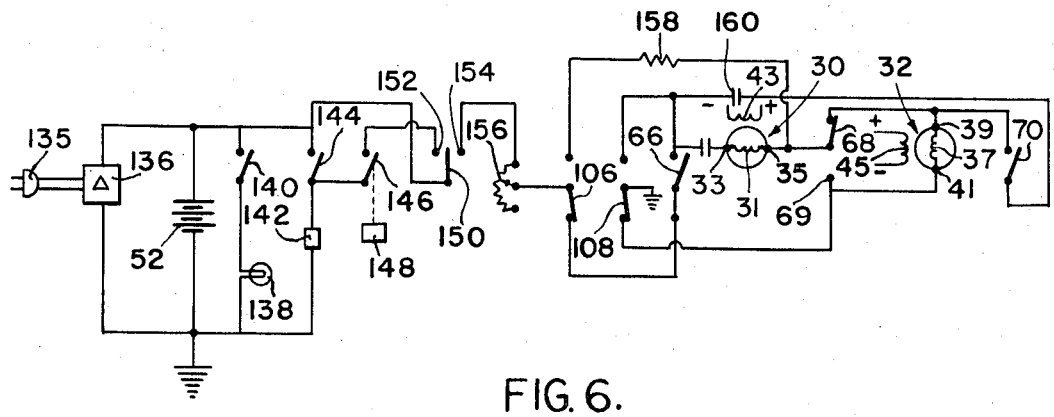
FIG. 6 is a circuit diagram of the new and improved electric drive control apparatus.

Referring now to FIG. 6, battery 52 is shown connected to a source of charging power 135 through rectifier means 136 in a manner which is well known in the art. Electrical devices mounted on the vehicle such as lights 138 and horn 142 may be connected across the battery through switches 140 and 144, respectively. Switch 146 is actuated by "protect" unit 148 which may be a relay or other suitable unit which closes switch 146 when the vehicle is molested and causes horn 142 to sound. Switch 150 is a single pole, double-throw switch which has two positions, a "protect" position 152 and an "on" position 154. With switch 152 in the "protect" position, when the vehicle is molested so that relay 148 closes switch 146, horn 142 will be energized. When switch 150 is in the "on" position, as indicated by reference numeral 154, current is provided from battery 52 to rheostat 156 which provides a variable resistance in series with motor 30 and 32 for reducing the current flow to the motors, thus giving variable speed control. Switch devices 106, 108, 66, 68 and 70 are actuated by actuator arm 88 as disclosed above in reference to FIGS. 4 and 5. Switch devices 106 and 108 comprise a double-pole, double-throw reversing switch used to reverse the polarity to motor 30 for reverse operation. This reversing switch is actuated by pushing the left control plunger 92 discussed above relative to FIG. 4.

Motor 30 is shown as including an armature winding 31 having first and second terminals 33 and 35, whereas motor 32 is shown as having an armature winding 37, including first and second terminals 39 and 41. These motors are shown as being reversible motors having a permanent magnet field or shunt field windings 43 and 45, as shown. However, it should be understood that the circuit is not limited to this particular type of motor. With the actuator bar in the position shown in FIG. 4, the switching devices 66, 68, 70, 106 and 108 are positioned as shown in FIG. 6. One side of the armature winding 33 is connected to the power source through switch devices 66 and 106.

Second switching device 68 may be selectively connected with terminal 39 of armature winding 37 or battery 52 through terminal 41 and switch 108. Third switching device 70 is provided for connecting the first terminal 33 of winding 31 with the first terminal 39 of winding 37 through a circuit breaker 160.

In operation, forward motion of the vehicle is controlled by switch devices 66, 68 and 70 which are actuated consecutively by pressing the right plunger 90. The motors 30 and 32 are connected in series circuit relation when switch device 66 is actuated. Current is supplied from the source 52 through switch 150 which is in the "on" position through rheostat 156, switch device 106, switch device 66, motor 30, switch device 68, motor 32, and switch 108. With the motors connected in series, each motor operates at approximately one-half the voltage of the source 52 which can conveniently be 12 volts. With the motors connected thusly, the circuit provides low power and low speed performance with good electrical efficiency.

By movement of the right plunger further in the direction indicated by arrow 102, switch means 68 is actuated to contact terminal 69 and thereby connect the motor 30 directly across the battery 52 so that the full voltage of the battery is applied to the armature winding 31. Motor 32 is open-circuited and no current is supplied thereto. This is the normal running condition of the control system. With the use of the overrunning clutch 48 described above relative to FIG. 3, motor 30 can operate the vehicle without turning the armature of motor 32.

By moving the right plunger 90 further in the direction indicated by arrow 102, switch device 70 is actuated to complete the circuit between terminal 33 and terminal 39, whereby the armature windings 31 and 37 of motors 30 and 32, respectively, are connected in parallel circuit relation and the full voltage of the source 52 is applied to both motors, thereby enabling both motors to operate at full power. This latter condition provides high power for such conditions as soft ground or inclines where higher power is required.

Upon release of the right plunger 90 by the operator, the spring 130 pushes against actuator 88 and returns the switching devices 70, 68 and 66 to the position shown in FIG. 6 in reverse order of their actuation.

If it is desired to operate the vehicle in "reverse," the left-hand plunger 92 is pushed in the direction indicated by arrow 118. This will depress reeds 114 and 116 whereby switches 106 and 108 will be actuated to thereby reverse the polarity of the voltage supplied to motor 30. Resistor 115 is inserted in series with the motor winding 31 when the vehicle is operated in "reverse" direction to reduce the power to the motor so that it may be operated at a slower speed in the reverse direction. Automatic reset thermal-breakers 158 and 160 are also provided for protecting motors 30 and 32 against damage due to overload. Upon release of plunger 92, the left spring 130 returns actuator bar 88 to the position shown in the drawing, whereby the cycle can again be repeated.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. An electrically powered vehicle including first and second spaced-apart road wheels, handle means for steering said vehicle and being operably connected with one of said wheels, first and second electric motors drivingly connected with one of said road wheels, a source of electric power, a housing secured to said handle means, switch means mounted in said housing for connecting said source with said first and second motors in series circuit relation, for connecting said source with said first motor only, and for connecting said source with said first and second motors in parallel circuit relation whereby the power delivered to the vehicle can be controlled; said housing having connector means including means for disconnecting all electrical connection between said switch means and said source and said motors at substantially the same time.

2. An electrically powered vehicle including first and second spaced-apart road wheels, handle means to be grasped by the hand of an operator for steering said vehicle and being operably connected to one of said wheels, first and second electric motors drivingly connected with one of said road wheels, a source of electric power, a switch housing mounted on said handle means; switch means in said housing for connecting said source with said first and second motors in series circuit relation, for connecting said source with said first motor only, and for connecting said source with said first and second motors in parallel circuit relation whereby the power delivered to the vehicle can be controlled; and actuator means pivotally mounted in said housing for actuating said switch means and including means extending through said housing and operable to be pivoted by the vehicle operator while the hand of the said operator remains in contact with said handle means.

3. An electrically powered vehicle including first and second spaced-apart road wheels, first and second electric motors drivingly connected with one of said road wheels, a source of electric power, switch means for connecting said source with said first and second motors in series circuit relation, for connecting said source with said first motor only, and for connecting said source with said first and second motors in parallel circuit relation whereby the power delivered to the vehicle can be controlled; said switch means including first, second and third switching devices and movable actuator means including a first portion for actuating said switching devices and a second portion extending through said housing for engagement by the vehicle operator; said first switching device comprises means for connecting said source with said first motor, said second switching device comprises means for selectively connecting said first motor with either said second motor or said source, and said third switching device comprises means for connecting said first motor with said second motor.

4. An electrically powered vehicle including first and second spaced-apart road wheels, first and second electric motors drivingly connected with one of said road wheels, a source of electric power, switch means for connecting said source with said first and second motors in series circuit relation, for connecting said source with said first motor only, and for connecting said source with said first and second motors in parallel circuit relation whereby the power delivered to the vehicle can be controlled; said switch means including first, second, and third switching devices; said first motor including a first armature winding having first and second terminals, said second motor includes a second armature winding having first and second terminals, said first switching device includes means for connecting said source with the first terminal of said first armature winding, said second switching device includes means for selectively connecting the second terminal of said first armature winding with either the first terminal of said second armature winding or said source, said third switching device including means for selectively connecting said first terminal of said first armature winding with said second terminal of said second armature winding.

5. An electrically powered vehicle as set forth in claim 4, wherein said switching means further includes reversing switch means for providing current flow from said source with one of said motors to provide a flow of current in a direction opposite to that flowing when said first and second motors are connected in series circuit relation.

6. An electrically powered vehicle as set forth in claim 5, wherein said reversing switch means includes a fourth switching device including means for selectively connecting said source with said first switching device or with the second terminal of said first armature winding so that only said first motor operates in a reverse direction.

7. An electrically powered vehicle as set forth in claim 6, wherein said switch means further includes actuator means pivotally mounted in said housing for actuating said first, second and third switching devices when rotated in a first direction, and for actuating said reverse switching devices when rotated in the opposite direction.

8. An electrically powered vehicle including first and second spaced apart road wheels, first and second electric motors drivingly connected with one of said road wheels, handle means for steering said vehicle and being operably connected with one of said road wheels, a source of electric power, a switch housing secured to said handle means, switch means in said housing for connecting said source with said first and second motors in series circuit relation, for connecting said source with said first motor only, and for connecting said source with said first and second motors in parallel circuit relation whereby the power delivered to the vehicle can be controlled; and movable actuator means including a first portion for actuating said switching means and a second portion extending through said housing for engagement by the vehicle operator.

9. An electrically powered vehicle including first and second spaced-apart road wheels, a first electric motor drivingly connected with one of said road wheels, a second electric motor; clutch means for selectively coupling said second motor to said one road wheel; a source of electric power, switch means for connecting said source with said first and second motors in series circuit relation, for connecting said source with said first motor only, and for connecting said source with said first and second motors in parallel circuit relation whereby the power delivered to the vehicle can be controlled.

10. The vehicle as set forth in claim 9, wherein said first and second motors include first and second output shafts operably connected to said clutch means; said clutch means permitting said first motor, when energized alone, to drive said one road wheel without turning the second output shaft of said second motor but permitting said second output shaft to be coupled to said road wheel when both motors are energized.

11. An electrically powered vehicle including first and second spaced-apart road wheels, first and second electric motors drivingly connected with one of said road wheels, a source of electric power, switch means for connecting said source with said first and second motors in series circuit relation, for connecting said source with said first motor only, and for connecting said source with said first and second motors in parallel circuit relation whereby the power delivered to the vehicle can be controlled; said switch means including first, second and third switching devices, said first switching device comprises means for connecting said source with said first motor, said second switching device comprising means for selectively connecting said first motor with either said second motor or said source, and said third switching device comprises means for connecting said first motor with said second motor; and actuator means pivotally mounted in said housing for actuating said first, second and third switching devices when pivoted in a first direction, and movable force responsive means associated with each of said switching devices for actuating said switching devices in response to movement of said actuator means.

12. An electrically powered vehicle as set forth in claim 11, wherein said actuator means must contact said first switch device prior to contacting said second switch device so that said first switch cannot be deactivated until said second switch is deactivated.

13. An electrically powered vehicle as set forth in claim 12, wherein said actuator must contact said second switch device prior to contacting said third switch device so that said second switch device cannot be deactivated until said third switch is deactivated.

14. An electrically powered vehicle as set forth in claim 11, wherein each of said vertically movable portions of each switch device comprises a reedlike member having a portion mounted under said actuator means and extending diagonally upward in front of said actuator so that when said actuator is pivoted against said reedlike member, said reedlike member is forced downwardly.

15. An electrically powered vehicle as set forth in claim 14, wherein a biasing means is mounted between said housing and said actuator to bias said actuator against movement in either direction about its pivot.

16. An electrically powered vehicle including first and second spaced-apart wheels, first and second electric motors drivingly connected with one of operably wheels, handle means connected to one of said wheels by a steering drivingly for steering said vehicle, an electrical power source mounted on said vehicle, a housing mounted on said handle means; switch means mounted in said housing for connecting said source to said first and second motors, said switch means including at least one switch device and a vertically movable force responsive portion for actuating said switch device to open and close the circuit between said source and said motors, and actuator means pivotally mounted in said housing for engaging said vertically movable portion when said actuator means is pivoted.

17. An electrically powered vehicle as set forth in claim 16, wherein said switch device includes a reed means mounted under said actuator and extending angularly upwardly so as to be contacted and moved downwardly when said actuator is rotated.

18. An electrically powered vehicle as set forth in claim 17, wherein a first plurality of said switch devices are mounted on one side of the pivot point of said actuator means, and said actuator means is mounted for sequentially engaging said reed means to actuate said switch devices when said actuator means is rotated in a first direction so that each switch device cannot be deactivated until the later actuated switches are deactivated by rotation of said actuator means in the opposite direction.

19. An electrically powered vehicle as set forth in claim 18, wherein a second plurality of said switch devices are mounted on the opposite side of said pivot point, said actuator means being mounted for engaging the reed means of said second plurality of switch devices when said actuator means is rotated in said opposite direction.

20. An electrically powered vehicle as set forth in claim 18 wherein said actuator means comprises a laterally extending bar including first and second portions extending through said housing so as to be engageable by the operator, biasing means being provided between said housing in said actuator means to bias said actuator means against movement about said pivot.

21. An electrically powered vehicle as set forth in claim 20, wherein all electrical connections between said switch means and said source and motor pass to a single connector mounted on said housing to enable quick disconnection of all circuits.

22. An electrically powered vehicle as set forth in claim 16, where said switch means further includes a cover for said housing, said cover including support means for rigidly connecting said switch device with said cover.

23. An electrically powered vehicle as set forth in claim 22, wherein said actuator means is pivotally mounted on a pivot pin depending from said cover.

24. An electrically powered vehicle including first and second spaced-apart wheels, electric motor means drivingly connected with one of said wheels, handle means connected to one of said wheels by a steering column for steering said vehicle, an electrical power source mounted on said vehicle, forwarding switch means mounted on said handle means for connecting said source to said motor means such that current flows to said motor means in a first direction; reversing switch means mounted on said handle means for connecting said source to said motor means such that current flows to said motor means in an opposite direction; and movable force responsive portions for actuating said forwarding and reversing switching means to open and close the circuit between said source and said motor means, and manually movable actuator means for engaging the movable force responsive portion of said first switching means to actuate said first switching means when said actuator means is moved in a first direction and for engaging the vertically movable portion of said second switching means to actuate said second switching means when said actuator is moved in the opposite direction.

25. An electrically powered vehicle including first and second spaced-apart road wheels, electric motor means drivingly connected with one of said wheels, handle means connected to one of said wheels by a steering column for steering said vehicle, an electrical power source mounted on said vehicle, a switch housing supported by said steering column at said handle means, manually operable switch means mounted on said switch housing for selectively connecting said source to said motor means; and connector means in said switch housing including means for disconnecting all electrical connection between said switch means and said source and said motor means at substantially the same time.

26. An electrically powered vehicle including first and second spaced-apart road wheels, first and second electric motors drivingly connected with one of said wheels, steering means connected to one of said wheels by a steering column for steering said vehicle, an electrical power source mounted on said vehicle, switch means mounted on said steering means for connecting said source to said first and second motors, said switch means including at least one switch device and a movable force responsive portion for actuating said switch device to open and close the circuit between said source and said motors; and movable actuator means for engaging said force responsive movable portion to actuate said switch device.

UNITED STATES PATENT OFFICE
CERTIFICATE OF CORRECTION

Patent No. 3,570,620         Dated March 16, 1971

Inventor(s) Gene L. Fisher  and  Allan R. Thieme

It is certified that error appears in the above-identified patent and that said Letters Patent are hereby corrected as shown below:

In column 7, line 52, change "operably" to -- said --; column 7, line 53, change "drivingly" to -- column --.

Signed and sealed this 9th day of November 1971.

(SEAL)
Attest:

EDWARD M. FLETCHER, JR.
Attesting Officer

ROBERT GOTTSCHALK
Acting Commissioner of P